(12) United States Patent
Fischer et al.

(10) Patent No.: US 8,910,809 B2
(45) Date of Patent: Dec. 16, 2014

(54) TEAT UNIT

(75) Inventors: René Fischer, Zürich (CH); Etienne Furrer, Zug (CH); Bernhard Emmenegger, Lucerne (CH)

(73) Assignee: Medela Holding AG, Baar (CH)

( * ) Notice: Subject to any disclaimer, the term of this patent is extended or adjusted under 35 U.S.C. 154(b) by 0 days.

(21) Appl. No.: 13/432,162

(22) Filed: Mar. 28, 2012

(65) Prior Publication Data

US 2012/0248056 A1    Oct. 4, 2012

(30) Foreign Application Priority Data

Mar. 29, 2011  (CH) ...................................... 0571/11

(51) Int. Cl.
  *A61J 9/00*   (2006.01)
  *A61J 11/00*  (2006.01)
  *A61J 11/04*  (2006.01)

(52) U.S. Cl.
  CPC ............ *A61J 11/0065* (2013.01); *A61J 11/002* (2013.01); *A61J 11/04* (2013.01)
  USPC .......................... 215/11.1; 215/11.4; 215/11.5

(58) Field of Classification Search
  CPC ............ A61J 13/00; A61J 11/00; A61J 17/00
  USPC ........................................ 215/11.1, 11.4, 11.5
  See application file for complete search history.

(56) References Cited

U.S. PATENT DOCUMENTS

| | | | |
|---|---|---|---|
| 686,109 A | | 11/1901 | Muhlhens |
| 990,662 A | * | 4/1911 | MacGlashan ................ 215/11.4 |
| 1,605,427 A | | 11/1926 | Delmas |
| 2,584,359 A | * | 2/1952 | Miles ........................... 215/11.4 |
| 2,747,573 A | * | 5/1956 | Schaich ........................ 215/11.4 |
| 3,516,564 A | * | 6/1970 | Pohlenz ........................ 215/11.5 |
| 3,593,870 A | * | 7/1971 | Anderson ..................... 215/11.5 |
| 4,676,386 A | * | 6/1987 | Phlaphongphanich ...... 215/11.1 |

(Continued)

FOREIGN PATENT DOCUMENTS

| | | |
|---|---|---|
| CH | 698956 | 12/2009 |
| DE | 2219909 | 3/1973 |

(Continued)

OTHER PUBLICATIONS

International Search Report for Int. App. No. PCT/CH2012/000067, completed Jun. 19, 2012.

(Continued)

*Primary Examiner* — Fenn Mathew
*Assistant Examiner* — Christopher McKinley
(74) *Attorney, Agent, or Firm* — McDonnell Boehnen Hulbert & Berghoff LLP

(57) ABSTRACT

A teat unit has a teat with a suction opening, a support body, and a securing part for securing the teat unit on a drinking vessel. The securing part and the support body are fixedly connected to each other indirectly or directly, and they cannot be detached from each other without being destroyed. The support body has a surface with recesses, which are covered by the teat. The teat is overmoulded over the support body, wherein the teat covers the recesses. This teat unit permits a sucking action that is as natural as possible. It is of a simple construction and can be produced inexpensively, which means that it can be disposed of after one use.

20 Claims, 8 Drawing Sheets

(56) References Cited

U.S. PATENT DOCUMENTS

| | | | |
|---|---|---|---|
| 4,801,007 A * | 1/1989 | Rule | 206/217 |
| 4,993,568 A * | 2/1991 | Morifuji et al. | 215/11.1 |
| 5,101,991 A * | 4/1992 | Morifuji et al. | 215/11.1 |
| 5,553,726 A * | 9/1996 | Park | 215/11.4 |
| 5,791,503 A * | 8/1998 | Lyons | 215/11.5 |
| 5,860,540 A * | 1/1999 | Bock | 215/11.2 |
| 6,032,810 A * | 3/2000 | Meyers et al. | 215/11.1 |
| 6,161,710 A * | 12/2000 | Dieringer et al. | 215/11.4 |
| 6,176,380 B1 * | 1/2001 | Glories et al. | 215/11.1 |
| 6,286,697 B1 * | 9/2001 | Gasparini | 215/11.5 |
| 6,745,915 B2 * | 6/2004 | Rees | 220/714 |
| 6,923,337 B2 * | 8/2005 | Hession et al. | 220/714 |
| 7,070,065 B2 * | 7/2006 | Wong | 220/714 |
| 7,204,380 B2 * | 4/2007 | Webb et al. | 215/11.4 |
| 7,210,591 B2 * | 5/2007 | Goldman et al. | 215/11.1 |
| 7,287,657 B1 * | 10/2007 | Rodriguez | 215/11.1 |
| 7,419,069 B2 * | 9/2008 | Naesje | 220/714 |
| 7,537,128 B2 * | 5/2009 | Nachumi | 215/11.5 |
| 7,775,394 B2 * | 8/2010 | Naesje | 220/714 |
| 7,866,495 B2 * | 1/2011 | Rohrig | 215/11.5 |
| 2002/0063103 A1 * | 5/2002 | Kiernan | 215/11.4 |
| 2002/0066741 A1 * | 6/2002 | Rees | 220/714 |
| 2004/0035815 A1 * | 2/2004 | Webb et al. | 215/11.4 |
| 2004/0144792 A1 * | 7/2004 | Næsje | 220/714 |
| 2005/0224444 A1 * | 10/2005 | Akihiro | 215/11.1 |
| 2006/0081551 A1 * | 4/2006 | Hegg | 215/11.1 |
| 2009/0139950 A1 * | 6/2009 | Greter et al. | 215/11.5 |
| 2009/0314733 A1 * | 12/2009 | Pfenniger et al. | 215/11.1 |
| 2009/0314734 A1 * | 12/2009 | Pfenniger et al. | 215/11.1 |

FOREIGN PATENT DOCUMENTS

| | | |
|---|---|---|
| EP | 1779833 | 5/2007 |
| WO | 86/06273 | 11/1986 |
| WO | 99/22693 | 5/1999 |
| WO | 03/013419 | 2/2003 |
| WO | 2007/137440 | 12/2007 |
| WO | 2009/149575 | 12/2009 |
| WO | 2009/149576 | 12/2009 |
| WO | 2010/046812 | 4/2010 |
| WO | 2011/020203 | 2/2011 |

OTHER PUBLICATIONS

Swiss Search Report for App. No. 0571/2011, dated Jul. 12, 2011.

* cited by examiner

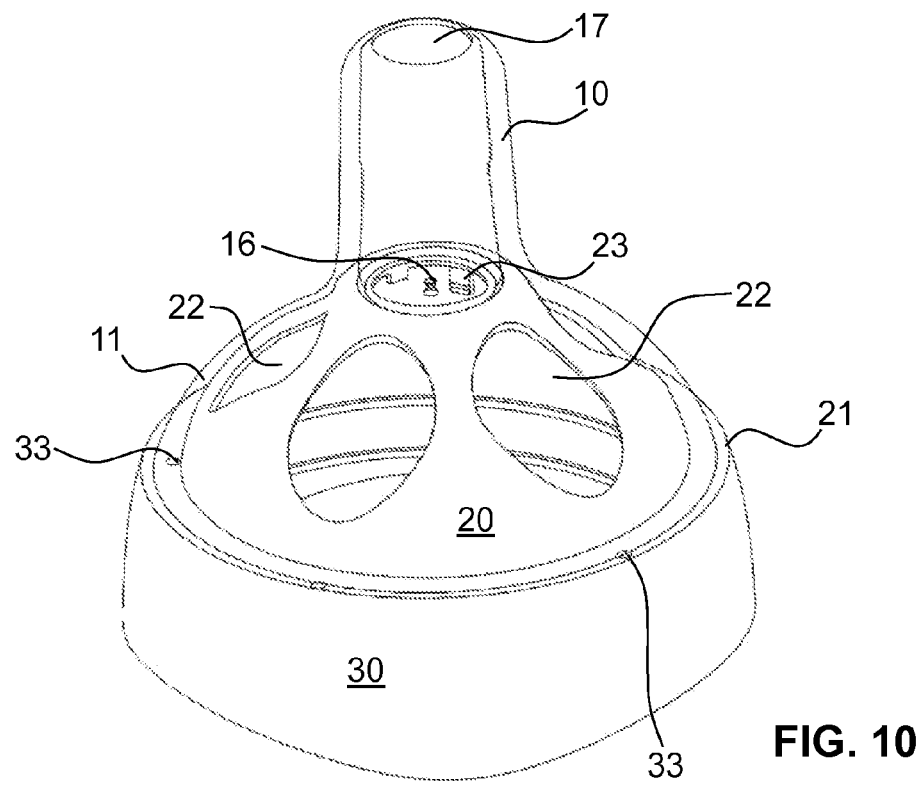
FIG. 10
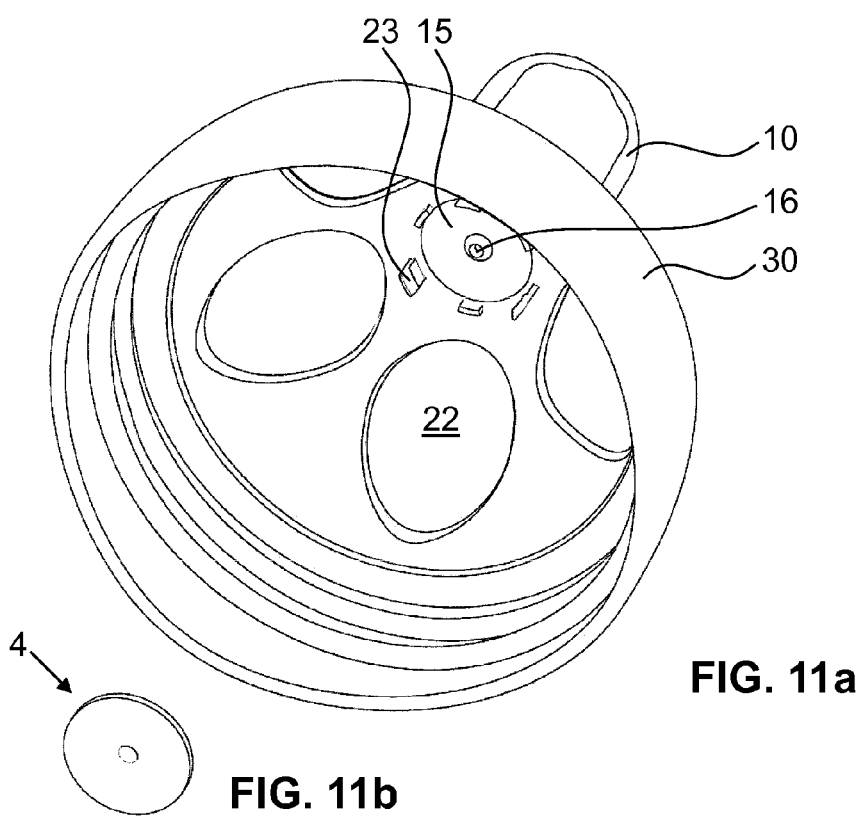
FIG. 11a
FIG. 11b

TEAT UNIT

CROSS REFERENCE TO RELATED APPLICATIONS

The present application claims priority to Swiss Application No. 0571/11 filed on Mar. 29, 2011, the contents of which is incorporated herein by reference in its entirety.

TECHNICAL FIELD

The present invention relates to a teat unit.

BACKGROUND

The traditional teat unit has a flexible teat and a stiff ring with an internal thread. The teat extends through the ring and has a flange bearing on the inside of the ring. The ring, with the teat thus fitted, can be screwed onto the neck of a bottle.

In U.S. Pat. No. 5,553,726, a non-return valve is additionally inserted in such a teat in order to avoid drips during pauses when the baby is not sucking U.S. Pat. No. 5,791,503 proposes a teat unit with teat and threaded ring, whereas this teat unit additionally has plates that can be mutually rotated and that have openings. In this way, air can be let into the bottle during the baby's suckling pauses.

Moreover, DE 2 219 909 and WO 86/06273 disclose one-piece teat units, in each of which a soft teat is formed integrally on a rigid threaded ring.

In U.S. Pat. No. 1,605,427, a one-piece teat can be pushed over the neck of a bottle without further securing means.

WO 03/013419 discloses a two-part teat with a non-return valve and a threaded ring for securing the teat on the baby's bottle.

US 2004/0035815 discloses a drinking cup with teat for infants. The teat and a valve element are held in a cover of the cup by means of a threaded ring.

WO 99/22693 discloses a relatively complicated teat unit enabling a natural sucking action. This unit comprises a threaded ring and a two-part teat body. The threaded ring is screwed with its internal thread onto an adapter part having an internal thread and an external thread, which adapter part is secured with its internal thread on a neck of a baby's bottle.

WO 2007/137440 describes a teat unit with a one-part or two-part teat and a dimensionally stable receiving head for receiving the teat. The one-piece receiving head is provided with a threaded ring, such that it can be screwed onto the neck of a baby's bottle or of a drinking cup. The teat is plugged onto the hemi-spherical receiving head but is not secured with the threaded ring.

WO 2009/149576 discloses a teat unit with a flexible teat, a substantially rigid receiving head and a rigid base part. Receiving head and base part are connected to each other via a releasable plug connection. When receiving head and base part are plugged together, the teat, which is pushed over the receiving head, is clamped between the latter and the base part. The unit is secured to a feeding bottle via a thread, which is arranged on the plug elements of the receiving head. The receiving head forms a support body for the main body of the teat and preferably has upwardly extending, soft supporting pads or resilient supporting wings. This teat unit has proven itself particularly effective for use by premature babies and by babies who have sucking problems.

WO 2009/149575 and WO 2011/020203 disclose teat units with a laterally arranged venting valve and with a flow limiting and non-return valve arranged in the milk channel. The venting valve serves to vent the baby's bottle, particularly during the baby's sucking pauses. The non-return valve prevents milk from flowing out of the suction opening during the baby's sucking pauses and also when the bottle is not in use. In addition, it limits the flow through the relatively wide suction channel and the similarly wide suction opening.

EP 1 779 833 describes a teat unit with a threaded ring for fixing the teat unit on a bottle and with a teat having a soft outer layer.

U.S. Pat. No. 686,109 shows a teat which can be pushed over a bottle and a support body arranged on the inner side with grooves or ribs.

Therefore, as has been shown above, a wide variety of teat units for a baby's bottle or feeding bottle are known. However, they are usually designed for repeat use, in which connection it was ensured that the teat can be easily cleaned.

However, particularly in hospitals, on journeys, or when feeding children who are ill, a teat unit is desirable that is suitable for single use, such that the problem of cleaning the teat does not arise. This teat unit should, however, permit a sucking action that is as natural as possible and in particular meet the needs of premature babies and of babies who have difficulties sucking.

SUMMARY

It is therefore an object of the invention to make available a teat unit which is suitable for disposal after one use and can be produced as inexpensively as possible, but which nevertheless permits a sucking action that is as natural as possible.

In a preferred embodiment, the teat unit according to the invention has a teat, a support body and a securing part, wherein the teat is arranged on the support body, and wherein the teat surrounds the support body at least partially and wherein the teat unit can be secured on a drinking vessel by means of the securing part. The support body and the securing part are indirectly or directly connected to each other, and they cannot be detached from each other without being destroyed. The support body has recesses, which are covered by the teat. The teat is overmoulded over the support body, wherein the teat is overmoulded over the recesses and wherein the teat covers the recesses.

This connection between securing part and support body can be rigid, or the two parts can move relative to each other by short distances. The connection is fixed and cannot be undone without destruction, that is to say if the connection is undone, it cannot be re-established.

This teat unit is of simple construction and is made up of a relatively small number of components. In many embodiments, it can be produced in one piece, for example in a two-component injection moulding method. This greatly reduces the production costs. However, due to the mouth support formed by the support body and of the softer zones formed in this mouth support, it simulates the human mother's breast and thus permits a sucking action that is as natural as possible. This teat unit is suitable in particular for disposal after one use, in particular for premature babies.

It is also advantageous that the teat unit does not have to be plugged together before use and instead is immediately ready for use. It only needs to be screwed onto a drinking vessel.

The recesses in the support body are preferably through-holes. However, they can also be depressions for example. This support body can be produced very inexpensively.

In a preferred embodiment, the support body is dome-shaped. However, it can also be hemi-spherical, for example, or designed as part of an oval. This shape ensures optimum mouth support for the suckling baby.

The support body and/or the securing part is preferably dimensionally stable and stiff or rigid.

A further advantage is that the teat can be made relatively thin and, particularly in the area of the support body, does not have to be designed to be self-supporting. The teat preferably surrounds the support body completely. Typical thicknesses of the teat are in the range of 0.3 to 5 mm, particularly 0.5 mm. Typical thicknesses of the support body are 0.3 to 5 mm, particularly 0.9 mm. This thin design, particularly of the teat made with the more expensive material, reduces the production costs.

In a preferred embodiment, the teat comprises a dome-shaped basic body which ends in a mouthpiece. The mouthpiece forms a suction channel and it is preferably self-supporting. This means the mouthpiece is not supported of the support body or it is not overmoulded over the support body. Preferably the mouthpiece protrudes over the support body.

Preferably, the teat has in the area of the recesses thickened parts that protrude into these recesses. This in particular prevents the relatively thin teat wall rubbing against the edges of the recesses and tearing. In addition, this zone is made softer. It is also possible to design further zones on the mouth support, in particular by thickened areas of the teat in further areas.

The recesses are preferably uniformly distributed across the surface of the support body. They can be located at different heights in relation to the longitudinal centre axis of the teat unit. However, they are preferably all located at the same height.

Four to seven such recesses are preferably present, in particular exactly five. They are preferably oval, whereas their longitudinal axis preferably extends from the top downward along a surface line of the support body. The recesses preferably extend approximately as far as an area in which the mouth support merges into a mouthpiece of the teat. This design of the recesses renders the teat unit to be similar to the human mother's breast.

The teat is preferably connected fixedly to the two other parts, particularly such that it cannot be detached without being destroyed. It is in particular overmoulded over the support body and/or the securing part or produced with these in a two-component injection moulding method. The teat, the support body and the securing part are preferably produced together in a two-component injection moulding method, and the teat preferably has a lower Shore A hardness than the support body and the securing part.

The support body and the securing part are preferably made of polypropylene (PP), a polyamide or another thermoplastic. They are both preferably dimensionally stable and rigid or stiff. The flexible and soft teat is preferably made of silicone, a silicone-based plastic, rubber, a thermoplastic elastomer (TPE) or another soft thermoplastic.

In a preferred embodiment, the teat connects the support body and the securing part indirectly to each other. The teat surrounds the support body partially or preferably completely. The teat is preferably secured on an upper edge of the securing part, in particular likewise by being overmoulded.

In another embodiment, the support body and the securing part are formed together in one piece and thus connected directly to each other. In this case too, the teat is overmoulded at least partially over the support body. Through-openings are preferably present in the connecting area between support body and securing part, such that the teat merges into a flange, which is located on the inside of the securing part.

The mouthpiece of the teat is preferably elongate. The mouthpiece preferably has the shape of a hollow cylinder or of a truncated cone with gently inclined flanks. The suction channel inside the mouthpiece is preferably designed with an approximately constant diameter, such that the suction opening too has a relatively large diameter and does not act as an appreciable flow limiter. This design also optimizes the sucking behaviour, particularly if a flow limiter is arranged in the area of the transition from the mouth support to the mouthpiece.

In a preferred embodiment, a non-return valve is present in order to avoid dripping from the teat unit during pauses when the baby is not sucking and to avoid drips when the teat is not in use. The non-return valve preferably serves at the same time as a flow limiter for the through-flow from the mouthpiece.

The non-return valve is preferably formed in part by the teat itself. For this purpose, a valve diaphragm is preferably formed integrally in the teat. An associated valve seat is arranged in the support body. The support body can itself be provided with a valve seat. For this purpose, however, an insert element is preferably provided which can be secured in the support body, for example by being clicked into place therein. A reverse arrangement of valve seat and diaphragm is also possible in particular.

In a preferred embodiment, a dimensionally stable insert element with at least one through-opening is arranged in the support body, and the through-opening forms a connection between an interior of the drinking vessel and the suction opening.

In another preferred embodiment, the valve seat is an insert element in the form of a plate, which is held in the support body. The plate can have a closed design, or it can be provided with through-openings.

The one-piece design of the teat with the non-return valve part, in particular the diaphragm, simplifies the construction of the unit and reduces the individual parts of the teat unit. This in turn minimizes the production costs.

A teat for securing on a drinking vessel and having a main body and a mouthpiece, wherein the mouthpiece has an inner suction channel which, at the free end of the mouthpiece, ends in a suction opening through which liquid can be sucked from the drinking vessel, and wherein a diaphragm with a through-opening is formed integrally on that end of the suction channel remote from the suction opening, can also be used in other teat units. It can be used in particular with teat units which do not have fixedly interconnected support bodies and securing parts and which in particular do not have the abovementioned softer zones. This arrangement permits the production of relatively inexpensive teat units which have a relatively small number of individual parts but which nevertheless afford the advantages of a flow limiter and non-return valve.

Preferably, the securing part is substantially a threaded ring. It preferably has an internal thread that can be screwed onto an external thread of the drinking vessel. The upper area of the securing part directed away from the vessel is in particular designed for unreleasable direct connection to the support body. If the connection is made via the teat, a suitable securing surface or overmoulding surface is present for the teat. If the connection is made directly, a suitable transition area or a suitable connecting surface to the support body is present.

Other preferred embodiments are set forth in the dependent claims.

BRIEF DESCRIPTION OF THE FIGURES

Preferred embodiments of the invention are described below with reference to the drawings, which serve solely for the purpose of illustration and are not to be interpreted as limiting the invention. In the drawings:

FIG. 10 shows a perspective view of the teat unit according to FIG. 8, with a transparent teat;

FIG. 11a shows a perspective view of the teat unit according to FIG. 8;

FIG. 11b shows a perspective view of an insert element according to FIG. 8;

Identical parts are provided with the same reference signs.

DETAILED DESCRIPTION

FIGS. 1 to 7 show a first illustrative embodiment of a teat unit according to the invention. It has a teat 1, a support body 2 and a securing part 3.

The support body 2 and the securing part 3 are rigid or stiff and/or dimensionally stable. They are preferably made of polypropylene (PP), a polyamide or another thermoplastic. The teat 1 is flexible and soft and is preferably made of silicone, a silicone-based plastic, rubber, a thermoplastic elastomer (TPE) or another thermoplastic.

The support body 2 and the securing part 3 are two independent parts connected fixedly to each other by the teat 1. They cannot be detached from each other without being destroyed. This one-piece teat unit is preferably produced in a two-component injection moulding method, in which the support body 2 and the securing part 3 are first produced, and then the support body 2 is encapsulated in order to form the teat 1 and create the connection to the securing part 3.

Figure 1:
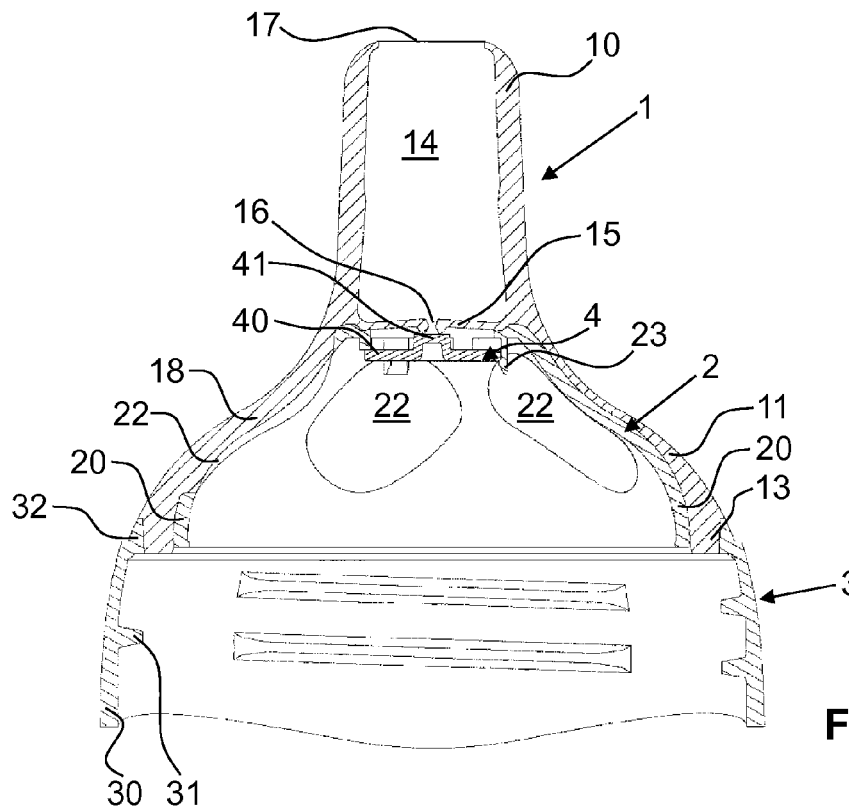
FIG. 1 shows a longitudinal section through a first embodiment of a teat unit according to the invention, with the valve closed.
Figure 2:
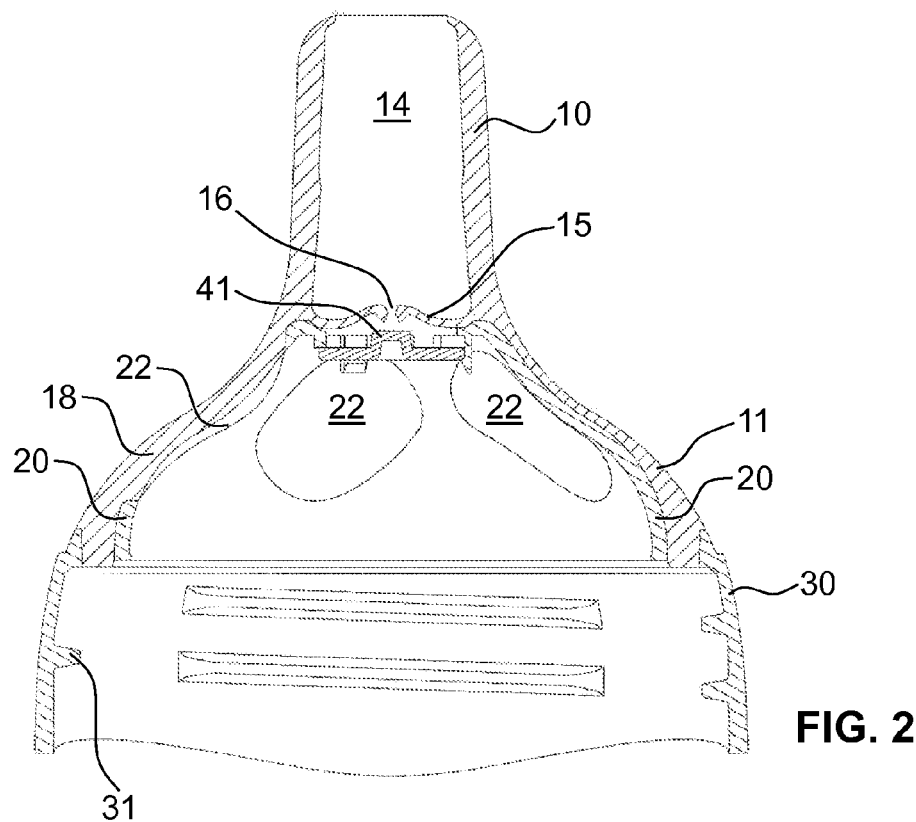
FIG. 2 shows the teat unit according to FIG. 1, with the valve opened.

As can be seen in FIGS. 1 and 2, the securing part 3 has a main body 30 in the form of a preferably rotationally symmetrical threaded ring with an internal thread 31. With this internal thread 31, the teat unit can be screwed onto a threaded neck of a bottle or of a drinking cup, in particular of a baby's bottle. In the upper part directed toward the teat, the securing part 3 has an inwardly offset and upwardly extending receiving ring 32. The latter serves, on the one hand, with its lower surface as an abutment for the threaded neck of the bottle or drinking cup. With its lateral inside wall, on the other hand, it forms a contact surface for overmoulding the teat 1.

The support body 2 has a substantially dome-shaped hollow main body 20. The main body 20 has recesses 22 distributed uniformly about its circumference. In this example, these are through-holes 22. These can be clearly seen in FIG. 7. The recesses 22 preferably have an oval shape, their longitudinal axis extending from the top downward along the surface line of the support body 2. In this example, the recesses 22 are all arranged at the same height and are all the same size. There are preferably four to seven recesses 22, particularly five of them. However, the recesses 22 can also be arranged at different heights and/or they can have different sizes and/or shapes.

In the upper area of the dome-shaped main body 20, a central opening is present through which the milk from the drinking vessel (not shown) is sucked into the suction channel 14 of the teat 1. This central opening has a relatively large diameter. It preferably corresponds approximately to the internal diameter of the suction channel 14. The central opening is preferably surrounded by securing means. They serve to secure a non-return valve or parts thereof. In this example, locking hooks 23 are present in which a valve plate 4 is locked (see FIGS. 1 and 6).

Figure 5:
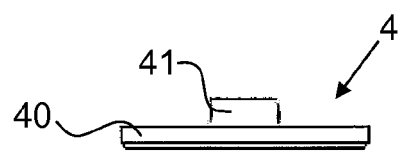
FIG. 5 shows a side view of an insert element according to the first illustrative embodiment.
Figure 6:
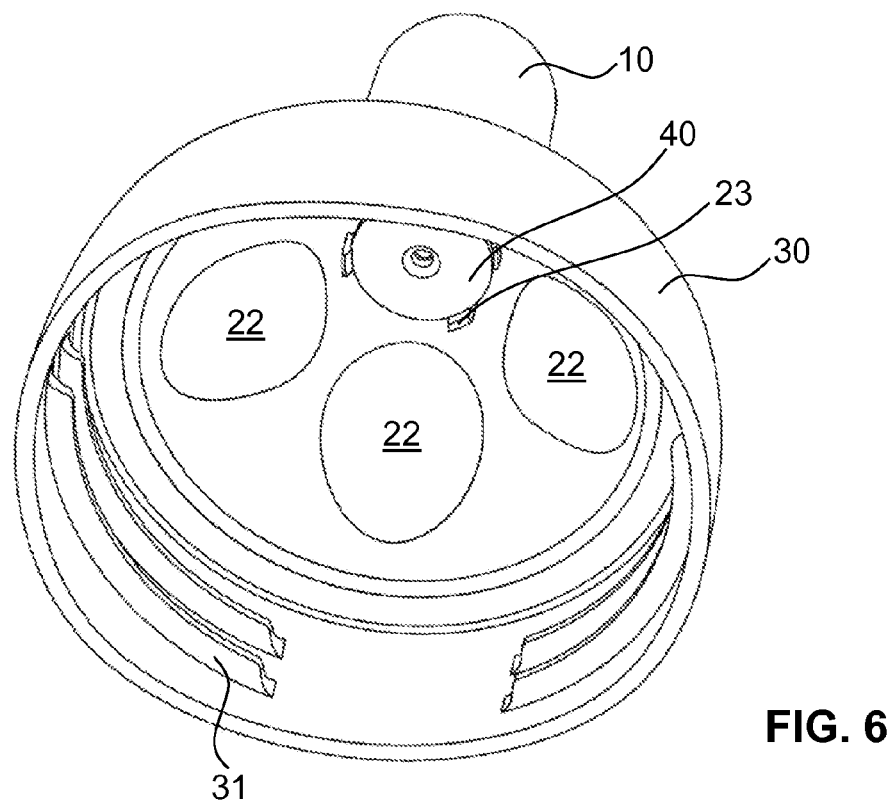
FIG. 6 shows a perspective view of the teat unit according to FIG. 1.
Figure 7:
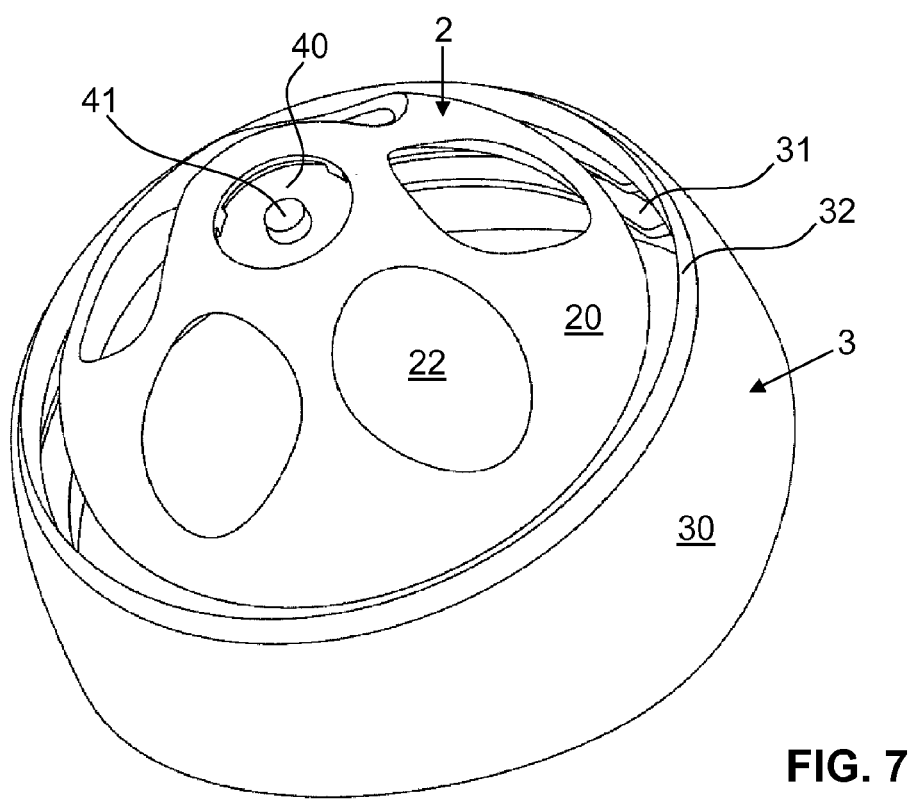
FIG. 7 shows a perspective view of the teat unit according to FIG. 1, without teat.
Figure 8:
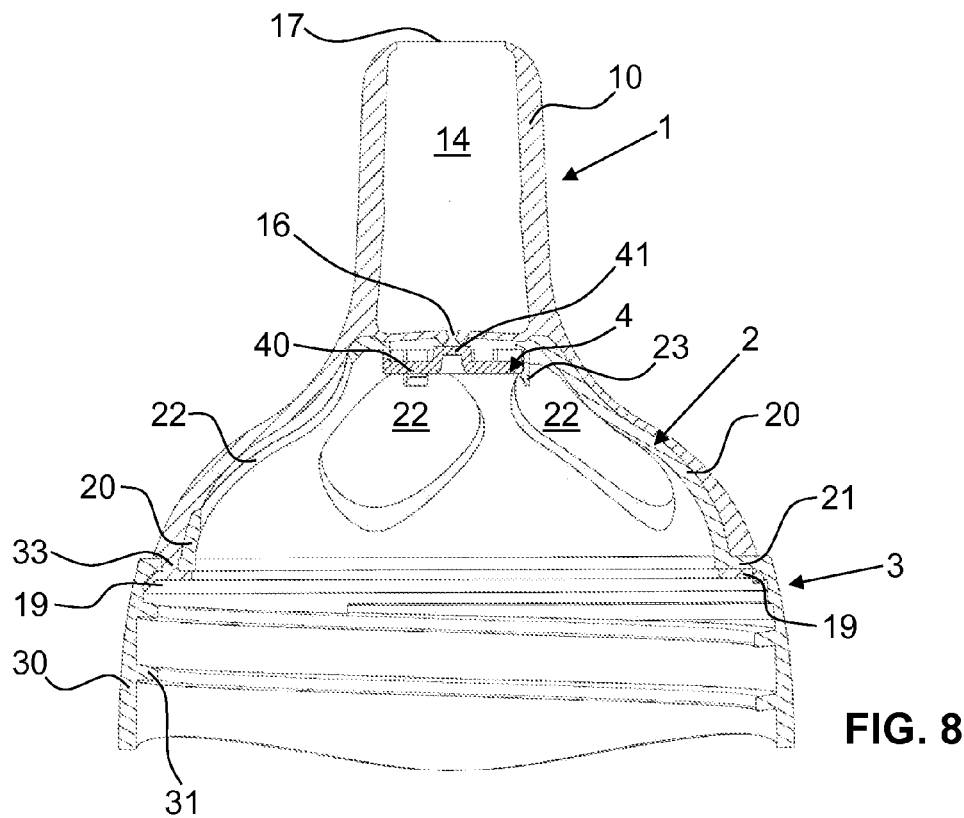
FIG. 8 shows a longitudinal section through a second embodiment of a teat unit according to the invention, with the valve closed.
Figure 9:
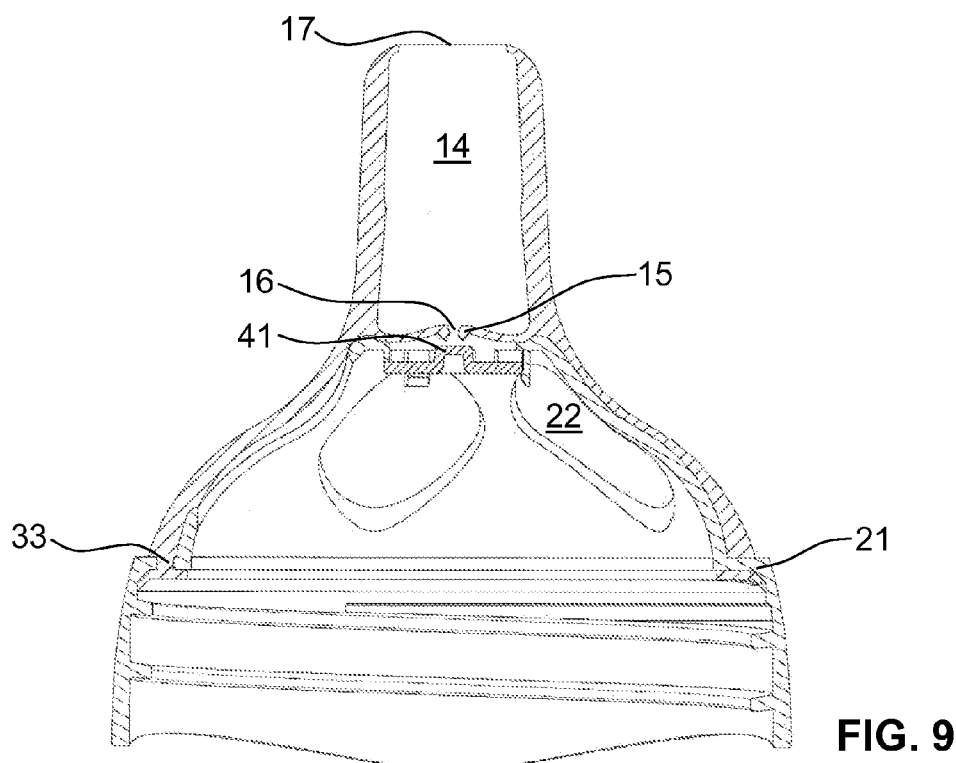
FIG. 9 shows the teat unit according to FIG. 8, with the valve opened.

In this illustrative embodiment, the valve plate 4 is round and has a closed design, as can clearly be seen in FIGS. 1, 5 and 7. It has a plane ring with a central elevation 41 which, with its outer upper face, forms a sealing surface for a valve diaphragm 15 described below. It is preferably rigid or stiff and/or dimensionally stable and is made of polypropylene (PP), a polyamide or another thermoplastic.

If the valve plate 4 has a closed design, it is locked in place at a distance from the upper wall of the support body 2, such that through-flow channels are present for the flow of milk from the interior of the support body 2 and thus from the drinking vessel to the central opening and thus to the suction channel 14. If the valve plate 4 is provided with holes, these serve as alternative or additional through-flow channels. The holes can be distributed on the plate or arranged at the periphery. It is also possible for a single hole to be present.

Figure 3:
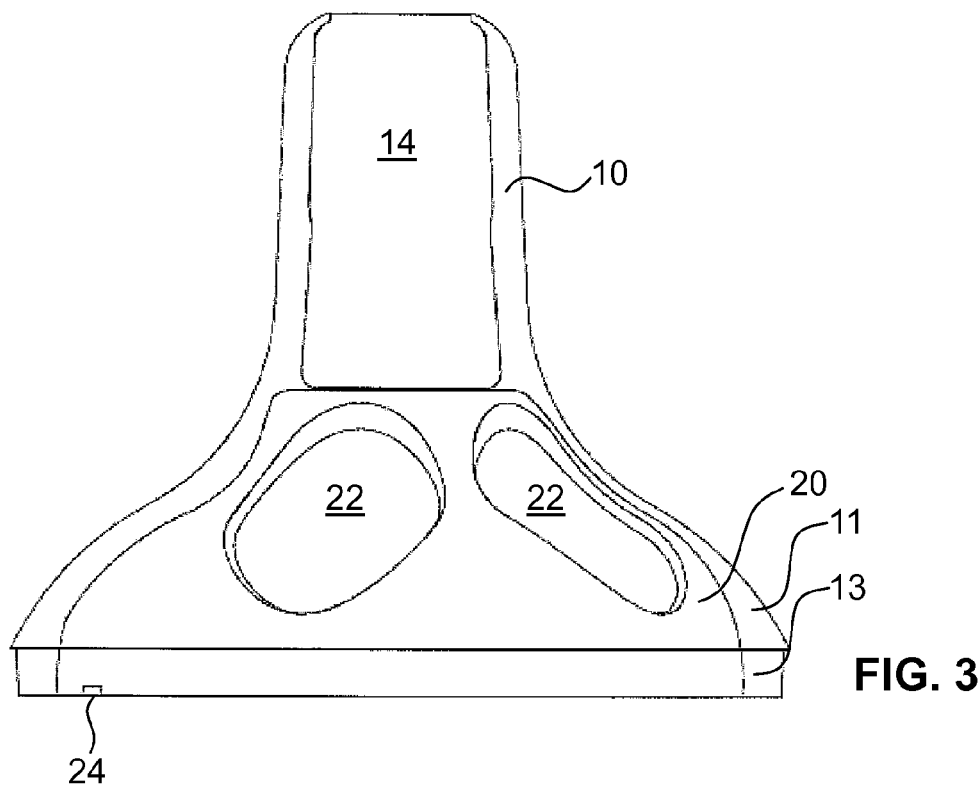
FIG. 3 shows a side view of a transparent teat and of a support body according to the first embodiment.
Figure 4:
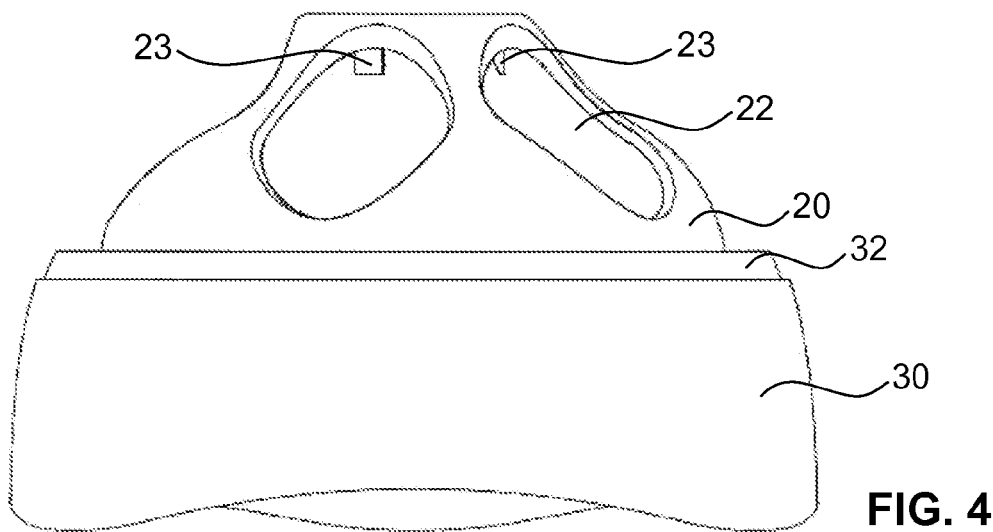
FIG. 4 shows a side view of the support body and of a securing part according to the first illustrative embodiment.

In its lower area, the support body 2 has an external diameter smaller than the internal diameter of the receiving ring 32 of the securing part 3. The support body 2 protrudes into the receiving ring 32. The gap is filled by the teat 1, which is fixedly connected both to the receiving ring 32 and also to the lower, outer circumference of the support body 2, in particular the teat 1 is overmoulded. For this purpose, it has a connecting ring 13, as can be seen clearly in FIGS. 1, 2 and 3. The connecting ring 13, as can be seen clearly in FIG. 3, is provided with a through-opening 24. The latter serves as a vent opening to ensure that, during pauses in sucking, air from the outside can be introduced into the drinking vessel via the internal thread 31 of the threaded ring 30 and the central upper opening of the dome-shaped support body 2.

The connecting ring 13 merges into a dome-shaped main body 11, which ends in a mouthpiece 10. The mouthpiece 10 is a hollow cylinder or has a slightly frustoconical design, and it forms the suction channel 14. The free end of the mouthpiece forms the suction opening 17, which is connected to the suction channel 14. The suction channel 14 preferably has no appreciable constrictions along its entire length and is relatively wide. Typical values for the internal diameter of the suction channel 14 are 3 to 12 mm, in particular 9.2 mm, and, for the length thereof, 10 to 30 mm, in particular 18 mm. The length is preferably such that a baby can take the mouthpiece 10 completely into its mouth.

The suction opening 17 is, like the cross section of the suction channel 14, preferably at least approximately round or polygonal. Its diameter is preferably 2 to 11 mm, in particular 6.8 mm. It is preferably only insubstantially smaller than the diameter of the suction channel 14.

The teat 1 extends with its main body 11 along the support body 2. Main body 11 and support body 2 together form a mouth support for the suckling baby, with the lips or mouth of the baby bearing on this mouth support.

The main body 11 is preferably fixedly connected to the support body 2, preferably by being overmoulded over the support body 2. However, it can also bear loosely thereon, or it can be fixedly connected to the support body 2 only at some places.

The main body 11 preferably covers the support body 2 completely. It at least covers the recesses 22, however. The main body 11 can have substantially a continuous thickness. In this example, however, it is thicker in the area of the recesses 22 than on the closed flanks of the support body 2, and these thicker zones 18 protrude into the recesses 22. This can be seen clearly in FIGS. 1 and 2. Typical thicknesses of the main body 11 in the area of the closed flanks are 0.5 to 3 mm, in particular 0.9 mm, and, in the area of the recesses 22, 0.7 to 5 mm, in particular 1.4 mm.

In the transition area from the main body 11 to the mouthpiece 10, i.e. in the lowermost area of the suction channel 14, a valve diaphragm 15 is formed integrally on the inner wall of the teat 1. It has a central diaphragm opening 16 with a peripheral pointed sealing lip. This sealing lip bears on the above-described sealing surface 41 of the valve plate 4. The valve plate 4 preferably presses the diaphragm 15 slightly upward, such that the latter is pretensioned. Valve diaphragm 15 and valve plate 4 form a non-return valve. The diaphragm opening 16 forms a flow limiter for the milk or liquid.

The non-return valve is closed in FIG. 1. This corresponds to the state when the teat unit is not yet in use. The valve also closes during pauses when the baby is not sucking, such that the flow of milk can be quickly interrupted and the baby does not choke. FIG. 2 shows the situation during sucking. The non-return valve is open and milk can flow into the suction channel. The soft and flexible mouthpiece is usually deformed in the baby's mouth during use. This is not shown in the figures.

FIGS. 8 to 11 show a second illustrative embodiment of the teat unit according to the invention. The teat unit is basically of the same design as in the first illustrative embodiment, and therefore the parts identical to both examples are not described here again. In contrast to the first example, however, the support body 2 and the securing part 3 are here connected directly to each other. They are produced together in one piece and are composed of a single part made from the same material. Suitable materials for this purpose are once again polypropylene (PP), a polyamide or another thermoplastic. Support body 2 and securing part 3 are once again rigid or stiff and/or dimensionally stable.

The fixed transition area between support body 2 and securing part 3 is formed by a circumferential and closed transition flange 21, which preferably extends perpendicularly with respect to the longitudinal axis of the two parts. This transition flange 21 forms a surface which, except for a few individual through-openings 33, is preferably completely closed.

Here too, the support body 2 is surrounded by the main body 11 of the teat 1. Here too, the teat 1 is preferably overmoulded. In this process it passes through the through-openings 33 and forms, on the inside of the threaded ring 30, a closed ring. The ring has a sealing action.

The valve plate 4 is shown closed here again. However, in this example too, it can have through-holes.

FIGS. 12 to 16 show a third illustrative embodiment. It is basically of the same design as the second illustrative embodiment. Here too, support body 2 and securing part 3 form a single part. They are connected fixedly and directly to each other and in one piece.

Figure 12:
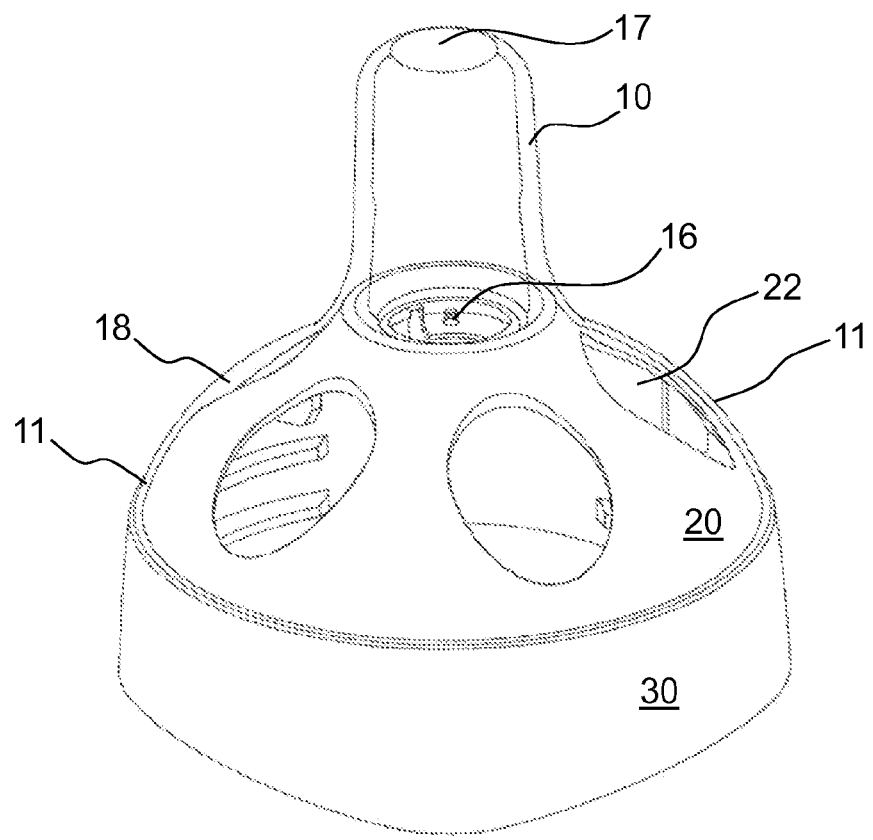
FIG. 12 shows a perspective and exploded view of a third embodiment of a teat unit according to the invention, with an insert element and a transparent teat.
Figure 12:
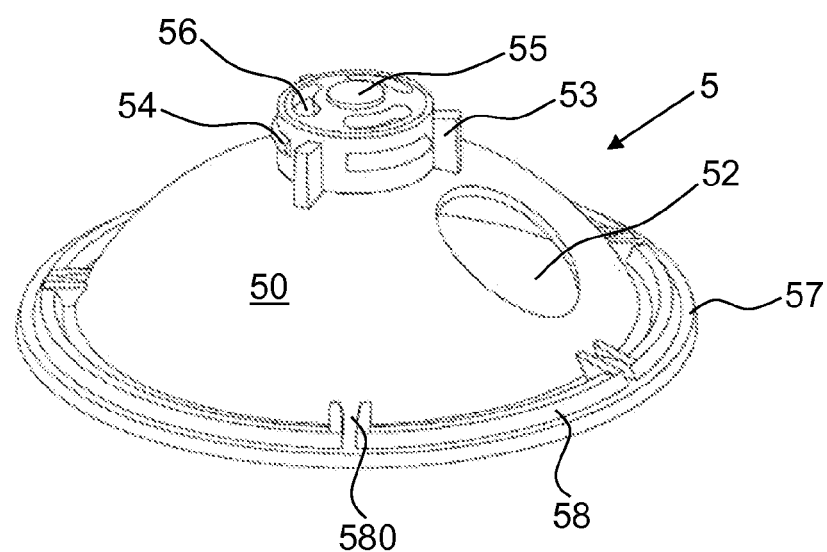

In contrast to the above-described valve plate 4, however, an insert element 5 is present here. This insert element 5 is shown in FIG. 12. It has a dome-shaped main body 50, which is arranged spaced apart from the inside of the support body 2 (see FIGS. 13 and 14).

At the upper end of the first insert element 5, there are radially protruding lugs 53 for securing against rotation, and locking ribs 54 which engage with corresponding locking means in the upper area of the support body 2 and fix the first insert element 5 in the support body 2. At the lower end of the main body 50, there is a complete circumferential flange 57, which is provided with protruding circumferential ribs 58. These ribs 58, for securing against rotation with respect to the main body 20, are designed with interruptions 580.

On the upper end of the main body 50, there is a plane sealing surface 55 to provide a bearing for the valve diaphragm 15 of the flow limiter and non-return valve. This sealing surface 55 is surrounded by through-flow openings 56 for milk.

In the flank of the main body 50, there is a lateral opening 52, which is preferably also oval, with its longitudinal axis preferably extending from the top downward.

This insert element 5 is preferably rigid or stiff and is preferably made of polypropylene (PP), a polyamide or another thermoplastic.

Figure 13:
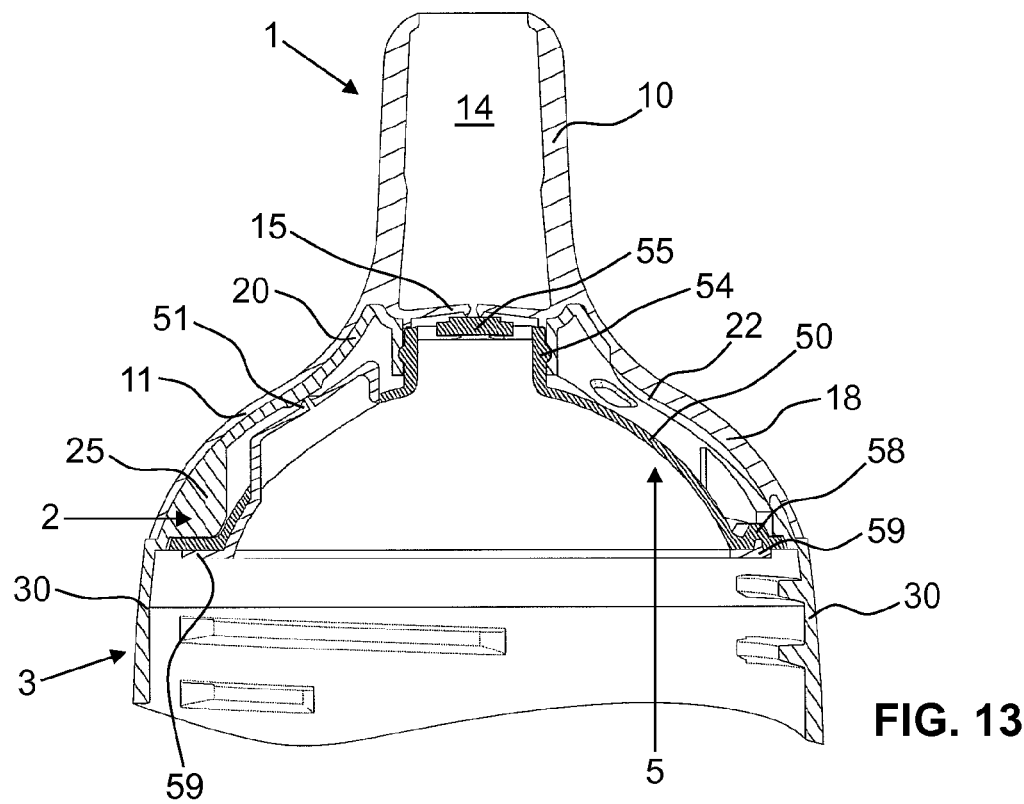
FIG. 13 shows a longitudinal section through the teat unit according to FIG. 12, with the valve closed.
Figure 14:
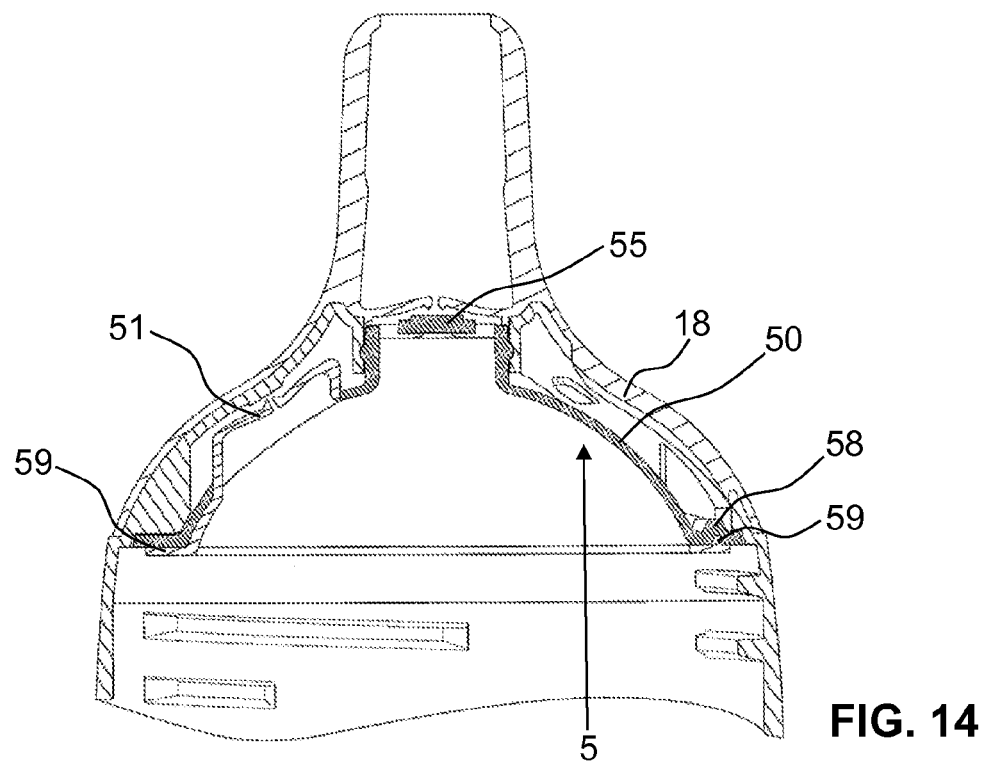
FIG. 14 shows the teat unit according to FIG. 13, with the valve opened.
Figure 15:
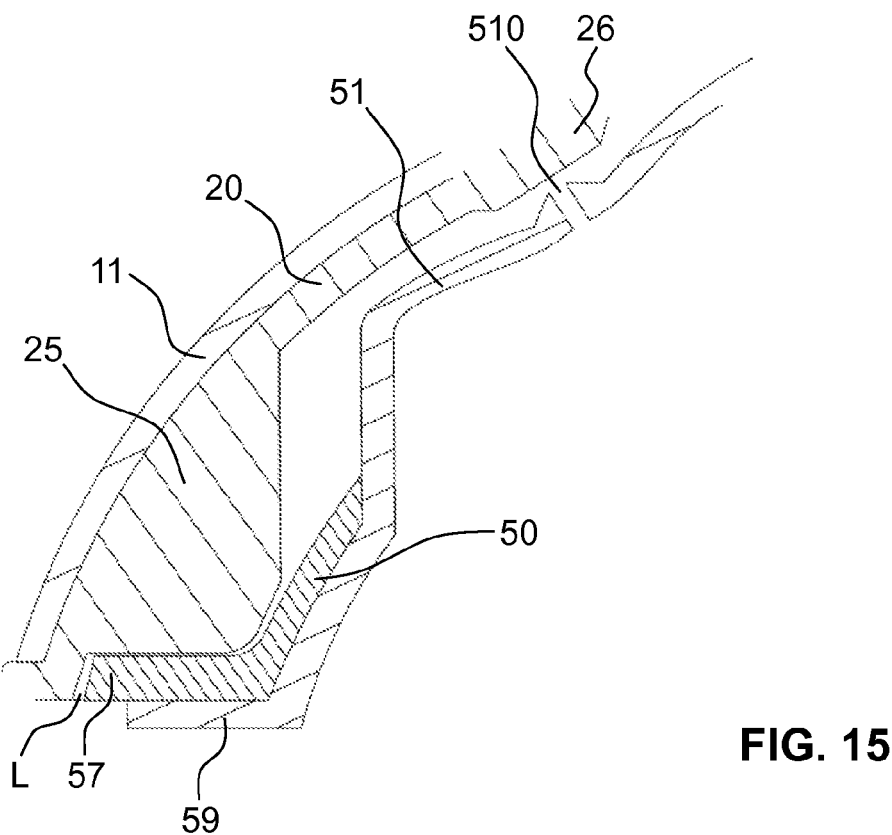
FIG. 15 shows an enlarged view of part of the teat unit according to FIG. 14 in the area of a venting valve.
Figure 16:
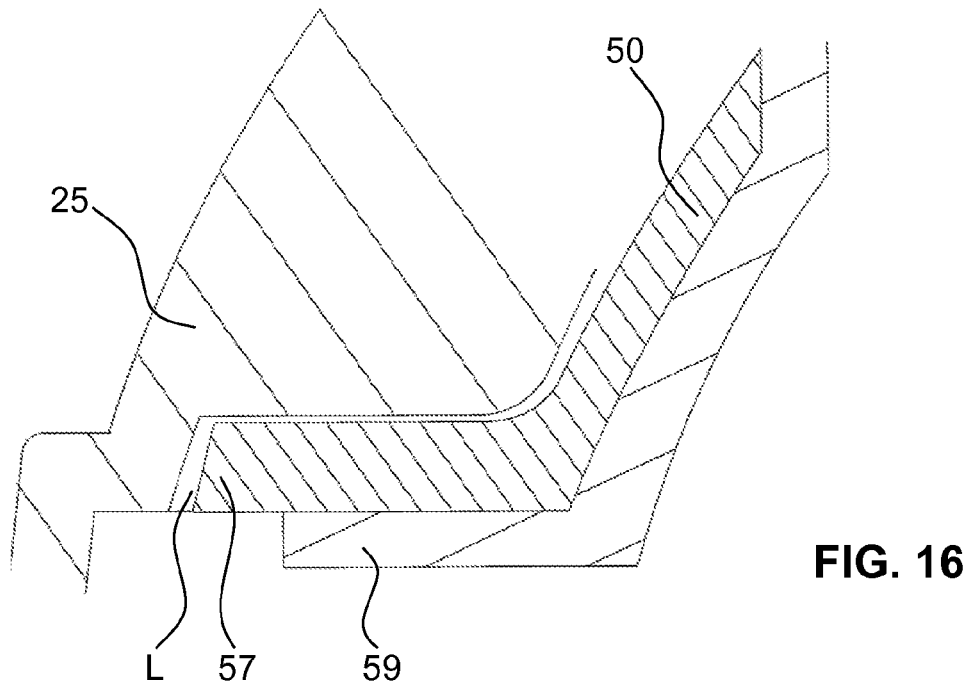
FIG. 16 shows an enlarged view of part of the teat unit according to FIG. 15.

The lateral opening 52 is closed by a vent diaphragm 51, as is shown in FIGS. 13 and 14. This diaphragm 51 is not shown in FIG. 12. The diaphragm 51 is secured on the main body 50, preferably by being overmoulded. It is preferably made of silicone, a silicone-based plastic, rubber, a soft thermoplastic elastomer (TPE) or another thermoplastic. Insert element 5 and diaphragm 51 can once again be produced, for example, in a two-component injection moulding method.

The soft diaphragm 51 is preferably overmoulded in such a way that the soft material extends as a circumferential ring 59 on the underside of the flange 57. The ring 59 has a sealing action.

The diaphragm 51 has a central vent opening 510, which is surrounded by a pointed sealing lip. With this sealing lip, the diaphragm 51 bears on a sealing surface 26 of the support body 2. This can be seen clearly in FIG. 15. The venting takes place via the internal thread 31 of the threaded ring 30 and via an air channel L between the flange 57 and the main body 20 as far as the vent diaphragm 51. This can be seen clearly in FIGS. 15 and 16. At least one radially inwardly protruding lug 25 is formed integrally on the main body 20, in this case several such lugs 25 which engage in the interruptions 580. This design serves for securing against rotation and at the same time for venting.

This insert can also be used in the first embodiment according to FIGS. 1 to 7 instead of the valve plate 4. In the first example, the shape of the support body 2, particularly in the area of the thickened part 25 and of the sealing surface 26, is preferably adapted according to the third example.

In this embodiment, the diaphragms of the non-return valve and of the venting valve are preferably only pretensioned when the teat unit is screwed onto a bottle.

The teat unit according to the invention permits a sucking action that is as natural as possible. However, it is of simple construction and can therefore be produced inexpensively, which means that it can be disposed of after one use.

The invention claimed is:

1. A teat unit with a teat, a support body and a securing part, the support body being dome-shaped or hemi-spherical or part of an oval, and the teat comprising a main body and a mouthpiece, the main body ending in the mouthpiece and the mouthpiece having a suction opening, wherein the teat is arranged on the support body, the main body extending along the support body, the main body and the support body together forming a mouth support for a suckling baby, wherein the teat surrounds the support body at least partially and wherein the teat unit can be secured on a drinking vessel by means of the securing part, wherein the support body and the securing part are fixedly connected to each other indirectly or directly, and once the connection is undone, it cannot be re-established, wherein the main body bears on the support body and is fixedly connected to the support body, and wherein the support body has recesses, which are covered by the main body of the teat, wherein the teat is overmoulded over the support body, and wherein the teat body is overmoulded over the recesses and wherein the teat covers the recesses, the recesses being depressions or through-holes, and wherein the support body comprises a closed circumferential rim above the recesses.

2. The teat unit according to claim 1, wherein the securing part and/or the support body is stiff and/or dimensionally stable.

3. The teat unit according to claim 1, wherein the recesses are uniformly distributed across the surface of the support body.

4. The teat unit according to claim 1, wherein four to seven recesses are present.

5. The teat unit according to claim 1, wherein the teat is made thicker in the area of the recesses.

6. The teat unit according to claim 1, wherein the teat connects the support body and the securing part to each other such that they cannot be detached without being destroyed.

7. The teat unit according to claim 1, wherein the support body and the securing part are designed together in one piece.

8. The teat unit according to claim 1, wherein the teat, the support body and the securing part are produced together in a two-component injection moulding method, and wherein the teat has a lower Shore A hardness than the support body and the securing part.

9. The teat unit according to claim 1, wherein a valve diaphragm is formed integrally in the teat, and an associated valve seat is arranged in the support body.

10. The teat unit according to claim 9, wherein the valve seat is arranged in the form of an insert element in the support body.

11. The teat unit according to claim 1, wherein a dimensionally stable insert element with at least one through-opening is arranged in the support body, and wherein the through-opening forms a connection between an interior of the drinking vessel and the suction opening.

12. The teat unit according to claim 11, wherein a diaphragm of a venting valve is arranged in the insert element and engages with a sealing surface of the support body.

13. The teat unit according to claim 9, wherein the valve seat is an insert element in the form of a plate, which is held in the support body.

14. The teat unit according to claim 1, wherein the securing part is substantially a threaded ring.

15. The teat unit according to claim 4, wherein five recesses are present.

16. The teat unit according to claim 1, wherein the support body comprises a circumferential rim directed to the mouthpiece of the teat and wherein the recesses are located at a distance to said rim.

17. The teat unit according to claim 1, wherein each of the recesses comprise a closed circumferential rim.

18. The teat unit according to claim 17, wherein the recesses have an oval shape.

19. The teat unit according to claim 1, wherein the support body extends into a region where the main body ends into the mouthpiece.

20. The teat of claim 1 wherein the teat is designed non-self-supporting in the area of the support body.

* * * * *